United States Patent [19]

Futamoto et al.

[11] Patent Number: 5,068,158
[45] Date of Patent: Nov. 26, 1991

[54] MAGNETIC RECORDING MEDIUM AND PROCESS FOR PREPARING THE SAME

[75] Inventors: Masaaki Futamoto, Kanagawa; Yukio Honda, Fuchu; Kazuetsu Yoshida, Kodaira, all of Japan

[73] Assignee: Hitachi, Ltd., Tokyo, Japan

[21] Appl. No.: 281,965

[22] Filed: Nov. 30, 1988

Related U.S. Application Data

[63] Continuation of Ser. No. 12,996, Feb. 10, 1987, abandoned.

[30] Foreign Application Priority Data

Mar. 7, 1986 [JP] Japan .................. 61-48257

[51] Int. Cl.$^5$ ............................................. G11B 23/00
[52] U.S. Cl. ...................... 428/694; 427/50; 427/128; 427/131; 427/132; 428/704; 428/900
[58] Field of Search ................. 428/694, 900, 704; 427/128, 132, 131

[56] References Cited

U.S. PATENT DOCUMENTS

| | | | |
|---|---|---|---|
| 4,231,816 | 11/1980 | Cuomo et al. | 428/450 |
| 4,239,835 | 12/1980 | Ijima et al. | 428/900 |
| 4,419,381 | 12/1983 | Yamazaki | 427/132 |
| 4,452,857 | 6/1984 | Yamazaki | 428/694 |
| 4,557,944 | 12/1985 | Arai et al. | 427/132 |
| 4,618,542 | 10/1986 | Morita et al. | 427/132 |
| 4,645,690 | 2/1987 | Murakami et al. | 428/694 |
| 4,663,193 | 5/1987 | Endo et al. | 428/900 |
| 4,707,756 | 11/1987 | Futamoto et al. | 428/694 |
| 4,726,988 | 2/1988 | Oka et al. | 428/694 |

FOREIGN PATENT DOCUMENTS

| | | |
|---|---|---|
| 72307 | 5/1982 | Japan . |
| 17216 | 1/1984 | Japan . |
| 250826 | 11/1986 | Japan . |
| 250827 | 11/1986 | Japan . |
| 278015 | 12/1986 | Japan . |

OTHER PUBLICATIONS

Derwent Abs. #85-240286/39 referencing J 60157716 to Canon.
Maeda, "Effect of Nitrogen ... ", J. Appl. Phys., 53(10), Oct. 1982, p. 6941.
Maeda, "High Coercivity Co ... ", J. Appl. Phy., 53(5), May 1982, p. 3735.

Primary Examiner—Paul J. Thibodeau
Attorney, Agent, or Firm—Antonelli, Terry, Stout & Kraus

[57] ABSTRACT

A magnetic recording medium comprises a non-magnetic substrate and a perpendicular magnetic film of Co-based alloy having a large perpendicular magnetic anisotropy having 0.001 to 5% by atom of nitrogen formed directly or through an underlayer on the non-magnetic substrate. A more preferable range of the nitrogen content is 0.01 to 1% by atom.

12 Claims, 2 Drawing Sheets

MAGNETIC RECORDING MEDIUM AND PROCESS FOR PREPARING THE SAME

This application is a continuation of application Ser. No. 07/012,996, filed Feb. 10, 1987 now abandoned.

BACKGROUND OF THE INVENTION

This invention relates to a magnetic recording medium and a process for preparing the same, and particularly to a thin metal film-type magnetic recording medium having a large perpendicular magnetic anisotropy and a process for preparing the same.

High density magnetic recording media can be made by forming a ferromagnetic thin film composed of such a metal as Co, Fe or Ni, or their alloy on a non-magnetic substrate by so-called physical vapor deposition such as vacuum evaporation, sputtering or ion plating. The thus obtained surface-coated, non-magnetic substrate is used as a magnetic recording medium. Particularly from such a perpendicular magnetic recording medium wherein magnetic domain is formed in a direction perpendicular to the film surface of the magnetic recording medium, a very high magnetic recording density such as 100 K bits per inch or more can be obtained.

The conventional perpendicular magnetic recording medium is disclosed in IEEE Trans. Magnetics, MAG 20, No. 5 (1984), pp 657–662, and it is necessary that a magnetic recording medium for use in perpendicular magnetic recording has so-called perpendicular magnetic anisotropy so that magnetization is liable to occur in a direction perpendicular to the film surface. The well known magnetic films having such properties include films of Co-based alloys such as Co-Cr, Co-Re, Co-V, Co-Mo, Co-Ta, etc. The films of these alloys can be formed on non-magnetic substrates by physical vapor deposition, but still have such problems that the perpendicular magnetic anisotropy of a magnetic film is reduced, or in a worst case, is lost, depending upon the apparatus and conditions for forming the film.

The magnetic properties of a magnetic recording medium depend upon various factors such as the composition of a magnetic film, a process for forming the film, and a substrate temperature and a film-forming rate during the formation of the film. Another factor having a large influence upon the magnetic properties is a gas atmosphere during the formation of a magnetic film, but no thorough investigation has been so far made as to this factor, and thus there is still a problem that magnetic films having good perpendicular magnetic anisotropy cannot be prepared with good reproducibility.

SUMMARY OF THE INVENTION

An object of the present invention is to solve the problems encountered in the prior art and to provide a magnetic recording medium having a perpendicular magnetic film with a high perpendicular magnetic anisotropy and a process for producing the same by physical vapor deposition with good reproducibility.

This and other objects of the present invention can be attained by a magnetic recording medium comprising a non-magnetic substrate and a film of Co-based alloy having a perpendicular magnetic anisotropy formed directly or through an underlayer on the non-magnetic substrate, the Co-based alloy film containing 0.001 to 5% by atom of nitrogen, and by a process for producing the same.

DETAILED DESCRIPTION OF PREFERRED EMBODIMENTS

Figure 1:
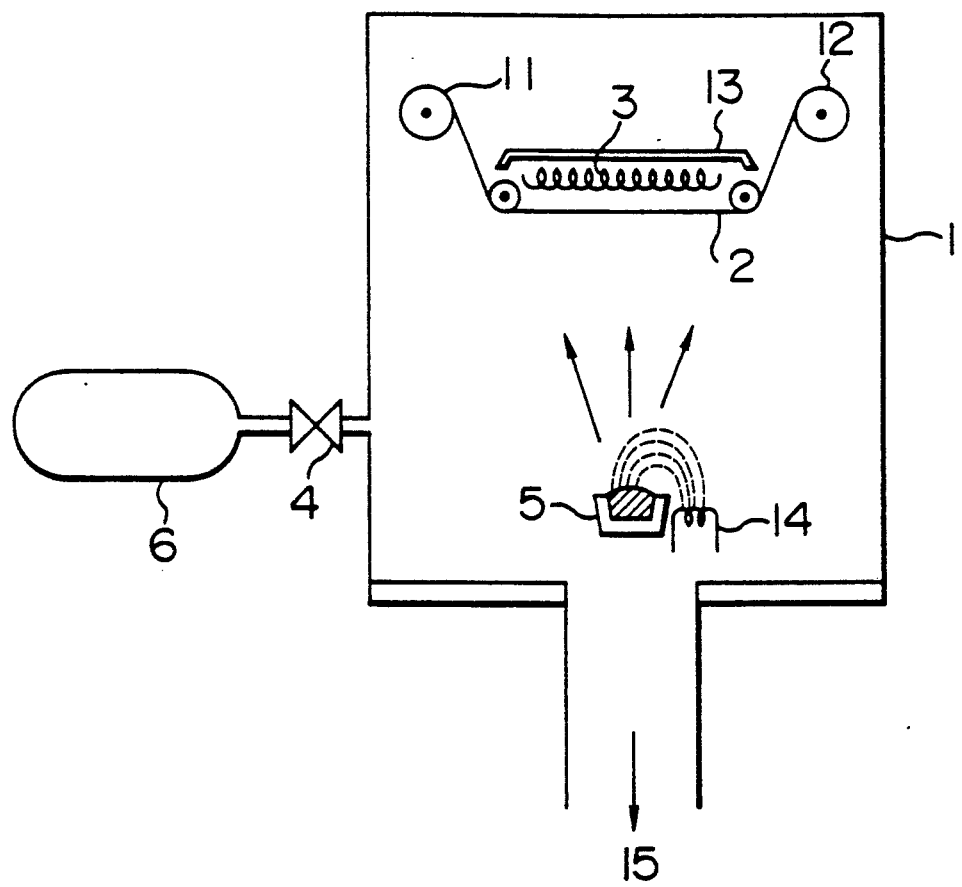
FIG. 1 is a vertical cross-sectional view of the structure of a vacuum evaporation apparatus according to one embodiment of the present invention.

The present magnetic recording medium can be prepared by forming a thin film of Co-based alloy as a magnetic film by physical vapor deposition in a nitriding gas atmosphere on a non-magnetic substrate.

In preparing a magnetic recording medium having a film of Co-based alloy having a perpendicular magnetic anisotropy by physical vapor deposition, e.g. vacuum evaporation, the present inventors have systematically investigated influences of a gas atmosphere for forming the film upon the magnetic properties by evacuating the vacuum chamber of a vacuum evaporation apparatus to an ultra high vacuum at first, then forming the film while introducing a specific gas into the vacuum chamber under a given pressure, and measuring the magnetic properties of the thus obtained magnetic film. As evaluation items of the magnetic properties, values obtained by measuring the coercive force $H_c$ and the ratio of remanence $M_r$ to saturation magnetism $M_s$ (magnetic remanence) in a direction perpendicular to the surface of a magnetic film and also in a direction in parallel to the surface of the magnetic film, i.e. perpendicular coercivity $C\perp$ and in-plane coercivity $C\|$, and perpendicular remanence $S\perp$ and in-plane remanence $S\|$, are compared with each other, respectively, where the suffixes ($\perp$) and ($\|$) represent the measurement in a direction perpendicular to the film surface and that in a direction in parallel to the film surface, respectively.

As a result of tests to form magnetic films in various gas atmospheres, the present inventors have found that a magnetic recording medium having a large perpendicular magnetic anisotropy can be obtained by forming a film while introducing particularly a nitriding gas, for example, a nitrogen gas or ammonia gas in a specific pressure range, and have established the present invention on the basis of this finding.

The content of nitrogen contained in the film of Co-based alloy as a magnetic film of the present magnetic recording medium is preferably in a range of 0.001 to 5% by atom. Below 0.001% by atom of nitrogen, the perpendicular magnetic anisotropy is not so effectively improved, whereas above 5% by atom the perpendicular magnetic anisotropy is deteriorated to the contrary. A more preferable range of the nitrogen content is 0.01 to 1% by atom.

In the formation of a nitrogen-containing film of Co-based alloy according to the present invention, the nitriding gas is preferably such gases as a nitrogen gas and an ammonia gas. A nitriding gas diluted with an inert gas such as an argon gas, etc. or an active gas such as a hydrogen gas, etc. can be also used. The pressure of the nitriding gas for use in the formation of the film of Co-based alloy is preferably in a range of $10^{-7}$ to $10^{-4}$ Torr. Below $10^{-7}$ Torr the content of nitrogen contained in the film of Co-based alloy is smaller and no positive effect on the improvement of perpendicular magnetic anisotropy can be obtained, whereas above $10^{-31\ 7}$ Torr it is difficult to form a stable magnetic film. More preferable pressure range for the nitriding gas is $3\times10$ to $4\times10$ Torr.

Nitrogen content of 0.001% by atom can be obtained under the nitriding gas pressure of $1\times10^{-7}$ Torr, 5% by atom under $1\times10^{-4}$ Torr, 0.01% by atom under $3\times10^{-7}$ Torr and 1% by atom under $4\times10^{-5}$ Torr The magnetic film of the present magnetic recording medium is desirably a film of at least one Co-based alloy selected from Co-Cr, Co-Re, Co-V, Co-Mo, Co-Ta, Co-Nb, Co-Cr-Re, Co-Cr-Nb, etc.

The present nitrogen-containing film of Co-based alloy can be formed preferably by physical vapor deposition, such as at least one of vacuum evaporation, sputtering, ion plating, etc.

The present magnetic recording medium having a magnetic film containing 0.001 to 5% by atom of nitrogen can be obtained by forming a film of Co-based alloy while introducing a nitriding gas under a pressure of $10^{-7}$ to $10^{-4}$ Torr into the vacuum chamber. In the present magnetic recording medium, the perpendicular magnetic anisotropy of the magnetic film is considerably improved, and the coercive force in a direction perpendicular to the film surface $H_{c\perp}$ can be at least 3 times as high as that in a direction in parallel to the film surface $H_{c\|}$, and the magnetic remanence ratio in a direction perpendicular to the film surface $S\perp$ can be at least 1.5 times as high as that in a direction perpendicular to the film surface $S\|$. This seems to be due to the fact that columnar crystal grains constituting the magnetic film of Co-based alloy are magnetically more isolated from one another by localizing the nitrogen atoms around the grain boundaries, and consequently the perpendicular magnetic anisotropy is increased. The procedure for introducing a nitriding gas can be simply incorporated into the step for forming the nitrogen-containing film of Co-based alloy by physical vapor deposition as a procedure for forming the film, and a magnetic film having a large perpendicular magnetic anisotropy can be easily formed with good reproducibility. This is quite an advantageous condition for obtaining a perpendicular magnetic recording medium having a large perpendicular magnetic anisotropy suitable for a higher density magnetic recording.

Embodiments of the present invention will be described in detail below, referring to the accompanying drawings.

EXAMPLE 1

Magnetic recording media were prepared using a 50 μm-thick polyimide film as a non-magnetic substrate in a vacuum evaporation apparatus shown in FIG. 1. At first, a vacuum chamber 1 was evacuated to a vacuum of $1\times10^{-8}$ Torr or less through an evacuation system 15, and a non-magnetic substrate 2 as a tape fed from a feed roll 11 to a winding roll 12 was heated to 180° C. by a heater 3 with a reflecting plate 13. A set of three electron beam evaporation sources 5 each with a filament 14 were actuated while introducing a nitrogen gas into the vacuum chamber 1 from a nitrogen gas source 6 through a leak valve 4 under a predetermined pressure, whereby at first an underlayer of Ge having the thickness of 300 Å was vapor deposited onto the substrate 2 and then a film of Co-Cr alloy having the thickness of 2,000 Å was formed thereon. Then, a film of B having the thickness of 200 Å was provided thereon as an uppermost protective layer.

Figure 2:
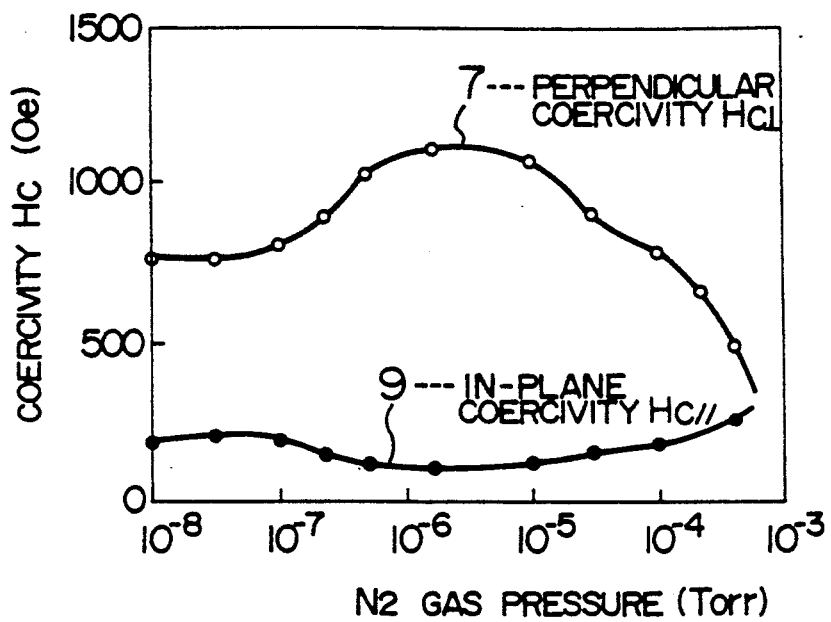
FIG. 2 is a diagram showing a relationship between the nitrogen gas pressure and the coercive force of the magnetic recording medium shown in Example 1 of the present invention.
Figure 3:
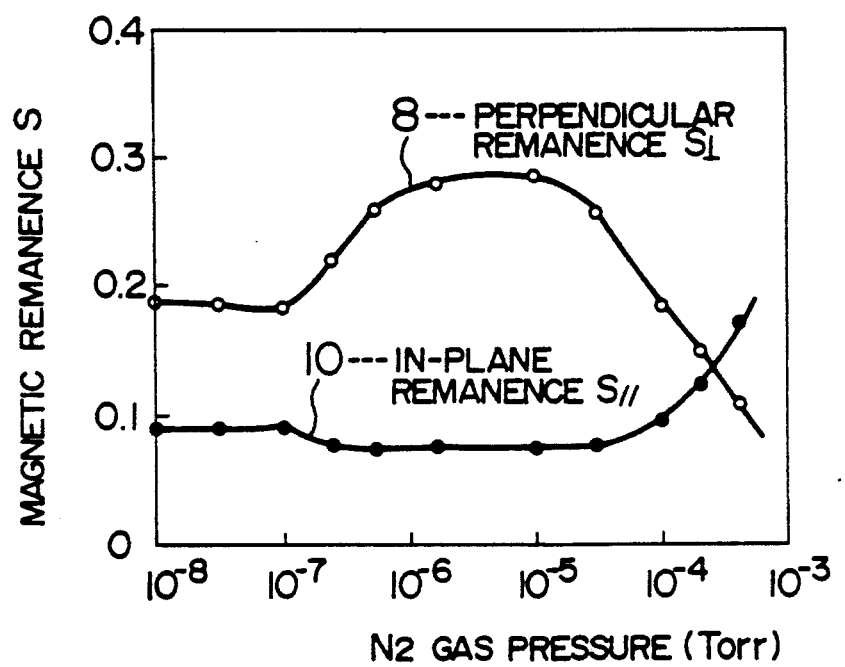
FIG. 3 is a diagram showing a relationship between the nitrogen gas pressure and the magnetic remanence ratio of the magnetic recording medium shown in Example 1 of the present invention.

The relationship between the coercive force $H_c$ (Oe) and the nitrogen gas pressure (Torr) of magnetic recording media prepared according to this procedure is shown in FIG. 2, and relationship between the magnetic remanance ratio S (remanence $M_r$/saturation magnetism $M_s$) and the nitrogen gas pressure (Torr) thereof is shown in FIG. 3.

As is obvious from FIG. 2 and FIG. 3, the values of coercive force in the perpendicular direction $H_{c\perp}$ (curve 7) and magnetic remanence ratio in the perpendicular direction $S\perp$ (curve 8) of the film of Co-Cr alloy were much increased by the introduction of the nitrogen gas, as compared with the values of coercive force in the parallel direction $H_{c\|}$ (curve 9) and magnetic remanence ratio in the parallel direction $S\|$ (curve 10). That is, the perpendicular magnetic anisotropy of the film of Co-Cr nitrogen gas pressure range of $10^{-7}$ to $10^{-4}$ Torr, the values of $H_{c\perp}$ and $S_\perp$ were increased, and were found to be desirable for forming the perpendicular magnetic film of a magnetic recording medium. It was found by Auger electron spectroscopy of ion micro-probe mass analysis that a series of these films of Co-Cr alloy contained 0.0005 to 8% by atom of nitrogen, and that films of Co-Cr alloy containing particularly 0.001 to 5% by atom of nitrogen had a good perpendicular magnetic anisotropy.

EXAMPLE 2

A series of films of Co-Cr alloy were formed in the same manner as in Example 1 while introducing a nitrogen gas into the vacuum chamber, except that the initial vacuum of the vacuum evaporation apparatus was set to $1\times10^{-6}$ Torr.

The magnetic characteristics of the films of Co-Cr alloy were investigated by comparing those obtained with the introduction of the nitrogen gas with those obtained without the introduction of the nitrogen gas, and it was found that both $H_{c\perp}$ and $S_\perp$ were more increased when the films were formed while introducing the nitrogen gas into the vacuum chamber. In case of the introduction of the nitrogen gas, the maximum allowable pressure was $2\times10^{-4}$ Torr. Above $2\times10^{-4}$ Torr, it was hard to form a stable film of Co-Cr alloy by vacuum evaporation. Under a nitrogen gas pressure of $1\times10^{-8}$ to $2\times10^{-4}$ Torr as introduced, the films of Co-Cr alloy had $H_{c\perp}$ values of 800 to 1,050 Oe and $S\perp$ values of 0.18 to 0.30, whereas without the introduction of the nitrogen gas the films had the $H_{c\perp}$ value of 730 Oe and the $S\perp$ value of 0.14.

EXAMPLE 3

Magnetic recording media of a laminate structure comprising a film of permaloy having a thickness of 5,000 Å as a first layer, a film of Si having a thickness of 200 Å as a second layer and a film of Co-Cr alloy having a thickness of 2,000 Å as a third layer were prepared in the same manner as in Example 1, except that an ammonia gas was used in place of the nitrogen gas. The magnetic characteristics of the thus prepared films of Co-Cr alloy were determined, and it was found that the films prepared while introducing the ammonia gas under a pressure range of $10^{-7}$ to $10^{-4}$ Torr had those $H_{c\perp}$ and $S_\perp$ values which increased with the same tendency as given by curves 7 and 8 in FIGS. 2 and 3 of Example 1. As compared with the case of introducing the nitrogen gas, the $H_{c\perp}$ and $S_\perp$ values were 20-40% increased under the same gas pressure when the ammonia gas was introduced. That is, the introduction of an ammonia gas was found to be more effective for increasing the perpendicular magnetic anisotropy. Furthermore, it was found by Auger electron spectroscopy or ion microprobe mass analysis that the films of Co-Cr alloy prepared while introducing the ammonia gas into the vacuum chamber contained 0.001 to 5% by atom of nitrogen.

It was found in tests using various gases conducted in parallel with the tests using the nitrogen gas or the ammonia gas that inert gases and hydrogen gas had no substantial influence upon the perpendicular magnetic anisotropy of films of Co-Cr alloy, whereas an oxygen gas, steam, etc. considerably deteriorated the perpendicular magnetic anisotropy. When an oxidative gas remained in the vacuum chamber, a large perpendicular magnetic anisotropy could be obtained by introducing a nitrogen gas or an ammonia gas into the vacuum chamber, and a more desirable effect could be obtained by preferentially removing the remaining oxidative gas from the vacuum chamber beforehand by means of, for example, a Ti getter pump, etc. in addition to the introduction of the nitrogen gas or the ammonia gas.

In the foregoing embodiments, the nitriding gas is exemplified by a nitrogen gas and an ammonia gas, but it has been found that the similar effect can be obtained with a gas mixture of nitrogen and ammonia, or gas mixtures of nitrogen, ammonia or nitrogen and ammonia diluted with such a gas as argon, hydrogen, etc.

The increase in the perpendicular magnetic anisotropy by the introduction of a nitriding gas in the formation of a magnetic film by vacuum evaporation has been found not only in case of films of Co-Cr alloy shown in the foregoing embodiments, but also in case of other films of Co-based alloys such as Co-Re, Co-V, Co-Mo, Co-Ta, Co-Nb, Co-Cr-Re, Co-Cr-Nb, etc. Furthermore, it has been found that the object of the present invention can be fully attained by other physical vapor deposition than the vacuum evaporation, for example, sputtering, ion plating, etc.

In the foregoing embodiments of the present invention, cases of providing a layer of other metal such as Ge, etc. as an underlayer to the film of Co-based alloy have been shown, but even in case of providing a film of Co-based alloy as a single layer directly on the non-magnetic substrate, inclusion of nitrogen into a film of Co-based alloy by the introduction of a nitriding gas is effective for increasing the perpendicular magnetic anisotropy.

As described above, in the present nitrogen-containing magnetic film of Co-based alloy, the values of coercive force and magnetic remanence ratio in a direction perpendicular to the film surface, i.e. $H_{c\perp}$ and $S_{195}$, respectively, are larger than those in parallel to the film surface, i.e. $H_{c\|}$ and $S_{81}$. That is, the perpendicular magnetic anisotropy is considerably increased and a very effective magnetic recording medium for obtaining a perpendicular magnetic recording system of higher reproduction output power with a higher recording density can be obtained.

The present nitrogen-containing magnetic film of Co-based alloy having a larger perpendicular magnetic anisotropy can be readily formed with good reproducibility simply by the introduction of a nitriding gas into a physical vapor deposition chamber. That is, a highly reliable magnetic recording medium suitable for high density magnetic recording can be prepared in good yield.

What is claimed is:

1. A magnetic recording medium which comprises a non-magnetic substrate and a film of a Co-based alloy having predominate magnetic anisotropy aligned perpendicular to a surface of said film and being formed on said substrate by vacuum evaporation in a nitriding atmosphere while adjusting the pressure of the nitriding gas to a range of $3 \times 10^{-7}$ t $4 \times 10^{-5}$ Torr, said film of Co-based alloy containing 0.01 to 1 atomic percent of nitrogen, wherein said film of Co-based alloy comprises columnar crystal grains of said Co-based alloy.

2. A magnetic recording medium according to claim 1, wherein the film of Co-based alloy is at least one alloy selected from the group consisting of Co-Cr, Co-Re, Co-V, Co-Mo, Co-Ta, Co-Nb, Co-Cr-Re, and Co-Cr-Nb.

3. A magnetic recording medium according to claim 1, wherein said underlayer is made of Ge.

4. A magnetic recording medium according to claim 1, wherein said underlayer is made of Si.

5. A magnetic recording medium according to claim 1, wherein said substrate has on an upper surface thereof an underlayer of Ge or Si, and said film of Co-based alloy is formed on said underlayer.

6. A process for preparing a magnetic recording medium which comprises forming a film of Co-based alloy having predominate magnetic anisotropy aligned perpendicular to a surface of said film on a non-magnetic substrate, wherein said film is formed to have columnar crystal grains of said Co-based alloy by vacuum evaporation in a nitriding gas atmosphere while adjusting the pressure of the nitriding gas to a range of $3 \times 10^{-7}$ to $4 \times 10^{-5}$ Torr and wherein said film of Co-based alloy contains 0.01 to 1 atomic percent of nitrogen.

7. A process according to claim 6, wherein the nitriding gas is selected from the group consisting of a nitrogen gas, an ammonia gas, a gas mixture of nitrogen and ammonia, a gas mixture of nitrogen diluted with argon or hydrogen, a gas mixture of ammonia diluted with argon or hydrogen, and a gas mixture of nitrogen and ammonia diluted with argon or hydrogen.

8. A process according to claim 6, further comprising removing any oxidative gas from a vacuum chamber in which the vacuum evaporation is carried out before forming said film of Co-based alloy.

9. A process according to claim 6, wherein said underlayer is made of Ge.

10. A process according to claim 6, wherein said underlayer is made of Si.

11. A process according to claim 6, wherein said film of Co-based alloy is at least one alloy selected from a group consisting of Co-Cr, Co-Re, Co-V, Co-Mo, Co-Ta, Co-Nb, Co-Cr-Re, Co-Cr-Nb.

12. A process according to claim 6, wherein said substrate has on an upper surface thereof an underlayer of Ge or Si, and said film of a Co-based alloy is formed on said underlayer.

* * * * *

UNITED STATES PATENT AND TRADEMARK OFFICE
CERTIFICATE OF CORRECTION

PATENT NO. : 5,068,158
DATED : November 26, 1991
INVENTOR(S) : FUTAMOTO, et al

It is certified that error appears in the above-identified patent and that said Letters Patent is hereby corrected as shown below:

In Claim 1, column 6, line 14, delete "t" and insert --to--.

Signed and Sealed this

Fourth Day of May, 1993

Attest:

MICHAEL K. KIRK

Attesting Officer

Acting Commissioner of Patents and Trademarks